(12) United States Patent
Goldberger et al.

(10) Patent No.: US 7,179,309 B2
(45) Date of Patent: Feb. 20, 2007

(54) SURFACE MOUNT CHIP CAPACITOR

(75) Inventors: Haim Goldberger, Modi'in (IL); Alex Eidelman, Bear Sheva (IL); Anatoly Agulyansky, Lehavim (IL); Ilia Skatkov, Bear Sheva (IL)

(73) Assignee: Vishay Sprague, Inc., Sanford, ME (US)

( * ) Notice: Subject to any disclaimer, the term of this patent is extended or adjusted under 35 U.S.C. 154(b) by 89 days.

(21) Appl. No.: 11/266,632

(22) Filed: Nov. 3, 2005

(65) Prior Publication Data
US 2006/0061939 A1   Mar. 23, 2006

Related U.S. Application Data

(62) Division of application No. 10/792,639, filed on Mar. 2, 2004, now Pat. No. 7,085,127.

(51) Int. Cl.
*H01G 9/00* (2006.01)
*H01L 21/20* (2006.01)
(52) U.S. Cl. ..................... 29/25.03; 438/381
(58) Field of Classification Search ............ None
See application file for complete search history.

(56) References Cited

U.S. PATENT DOCUMENTS 3,679,944 A * 7/1972 Yoshimura et al. ......... 361/527
3,828,227 A   8/1974 Millard et al.
4,009,424 A * 2/1977 Itoh ......................... 361/527

(Continued)

FOREIGN PATENT DOCUMENTS

WO   WO 02/103728 A   12/2002

*Primary Examiner*—Scott B. Geyer
(74) *Attorney, Agent, or Firm*—McKee, Voorhees & Sease, P.L.C.

(57) ABSTRACT

The surface mount chip capacitor of the present invention includes a wire and a conductive powder element electrically connected to the wire. The surface mount chip capacitor has insulative material surrounding at least a portion of the conductive powder element and the wire extending from the conductive powder element. A first terminal is formed on the surface mount chip capacitor at the first end surface of the wire and a second terminal is formed by being electrically connected to the conductive powder element. The surface mount chip capacitor of the present invention is created by methods which include the steps of forming a wire and placing conductive powder upon the wire. An embodiment of the present invention, presses the wire from a foil sheet and electrophoretically depositing the conductive powder element upon the wire.

23 Claims, 7 Drawing Sheets

U.S. PATENT DOCUMENTS

| | | | |
|---|---|---|---|
| 4,090,288 A | 5/1978 | Thompson et al. | |
| 4,494,299 A | 1/1985 | Franklin et al. | |
| 4,984,130 A | 1/1991 | Düll et al. | |
| 5,036,434 A * | 7/1991 | Kobayashi | 361/540 |
| 5,117,333 A * | 5/1992 | Kakuma et al. | 361/527 |
| 5,168,434 A * | 12/1992 | Kobayashi | 361/534 |
| 5,349,496 A | 9/1994 | Taniguchi et al. | |
| 5,390,074 A | 2/1995 | Hasegawa et al. | |
| 5,699,597 A * | 12/1997 | Nakamura et al. | 29/25.03 |
| 6,212,064 B1 * | 4/2001 | Aoki et al. | 361/523 |
| 6,238,444 B1 | 5/2001 | Cadwallader | |
| 6,380,577 B1 | 4/2002 | Cadwallader | |
| 6,410,083 B1 | 6/2002 | Pozdeev-Freeman | |
| 6,504,705 B2 * | 1/2003 | Shimada et al. | 361/528 |
| 6,510,043 B1 * | 1/2003 | Shiue et al. | 361/502 |
| 6,541,302 B2 | 4/2003 | Huber et al. | |
| 6,679,934 B2 | 1/2004 | Rao et al. | |
| 7,144,432 * | 12/2006 | Nakamura | 29/25.03 |
| 2003/0174461 A1 | 9/2003 | Takatani et al. | |
| 2004/0195093 A1 | 10/2004 | Cohen et al. | |

* cited by examiner

SURFACE MOUNT CHIP CAPACITOR

CROSS-REFERENCE TO RELATED APPLICATIONS

This application is a Divisional of U.S. Ser. No. 10/792,639 filed Mar. 2, 2004 now U.S. Pat. No. 7,085,127 and which application is hereby incorporated by reference in its entirety.

BACKGROUND OF THE INVENTION

The present invention relates to capacitors. More particularly, though not exclusively, the present invention relates to improved surface mount chip capacitors and methods for manufacturing the same.

BRIEF SUMMARY OF THE INVENTION

Capacitors exist in the art which are made from a capacitive element such as a tantalum slug or pellet. To create a conventional tantalum slug, tantalum powder is pressed with a binder and then exposed to a process for forming a polarized capacitor having a positive end and a negative end. A typical tantalum slug will have an anode comprised of a wire extending from the slug and a cathode comprised of a conductive surface formed at the opposite side of the tantalum slug.

The usual method for making tantalum pellets for use in tantalum capacitors includes steps wherein tantalum powder is first pressed or compacted into a pellet. The resulting pressed pellets then undergo a sintering process wherein the pellets are heated in a vacuum. The heating allows the tantalum particles to stick together so they can hold a lead wire, which functions as the anode.

Following the sintering process, the tantalum pellet is dipped in an acid solution to form a dielectric film on the outer surface of the pellet and the particles within the pellet which is typically tantalum pentoxide. The pellet and the particles within the pellet are then subsequently coated with various other metal-containing materials which form the cathode.

These capacitors have the anode and the cathode attached to a circuit board by connection wires.

Modern methods of mounting components use the possibility of soldering the components directly to conductor tracks of printed circuit boards without the use of connection wires. This technology is used to an ever increasing extent under the indication "Surface Mounted Device" (SMD).

Capacitors suitable for the SMD technique may be manufactured as a chip component and as a MELF component. Chip components generally have supporting members in the form of rectangular parallelepipeds which have end faces suitable for soldering or in the form of flipchips which have a face with both cathode and anode terminals suitable for soldering. MELF components (Metal Electrode Face Bonding) start from cylindrical supporting members having connection caps in which the connection wires are omitted and the caps themselves are made suitable for soldering at their surfaces by an electroplating treatment and are soldered directly with said connection caps to conductor tracks of printed circuit boards.

The great advantage of the SMD technology is that extremely high packing densities of components on the printed circuit boards are possible. For realizing ever increasing densities, smaller and smaller components suitable for the SMD technique become necessary.

However, SMD technology encounters problems with producing devices with productivity and uniformity. It can therefore be seen that there is a need for an improved surface mount chip capacitor and method for making the same.

In addition, current SMD technology may require the manipulation of individual capacitors as opposed to using techniques for mass manipulation of capacitors. One particularly useful technique of mass manipulation is through the use of a reel to reel process. Therefore, a further feature of the present invention is the provision of a capacitor that is efficiently manufactured using a reel to reel process.

Also, current SMD technology may be improved by the use of electrophoretic deposition. Some of the advantages of electrophoretic deposition include a high coating rate of charged particles upon the substrate, a resulting film of charged particles upon the substrate that is dense and uniform, a thickness of film that is able to be controlled by depositing condition, and a simple process that is easy to scale up. Accordingly, a still further feature of the present invention is the provision of a method that uses electrophoretic deposition to increase the capacitor uniformity, tolerance, capacitance and the density per volume.

It is still a further feature of the present invention to provide a surface mount chip that is easy to make and economical to manufacture.

The device and method of accomplishing these and other features will become apparent from the following description of the invention.

DETAILED DESCRIPTION OF THE PREFERRED EMBODIMENT

The present invention will be described as it applies to the preferred embodiment. It is not intended that the present invention be limited to the described embodiment. It is intended that the invention cover all alternatives, modifications, and equivalencies which may be included within the spirit and scope of the invention.

Figure 15:
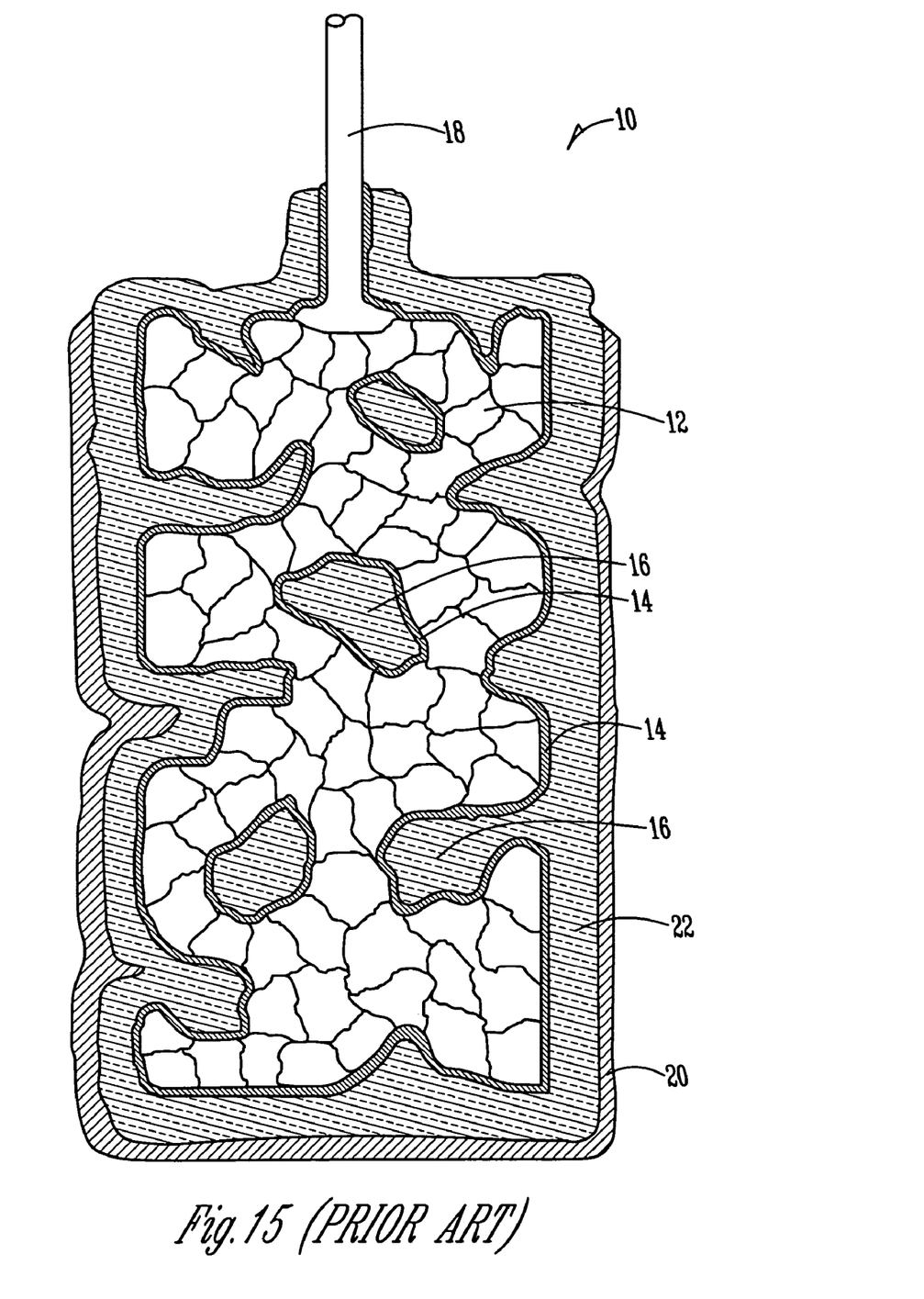
FIG. 15 is a schematic drawing of a prior art capacitor.

FIG. 15 shows a typical prior art capacitor 10. Capacitors are used in many types of electronic devices. The more popular uses for capacitors are in personal computers, disk drives, cellular phones, printers, hand held pagers, automobiles and in military equipment.

The capacitor 10, as shown, has two conductors, namely, the tantalum pellet 12 and the manganese dioxide ($MnO_2$) 16, which is actually a semiconductor. The dielectric film 14 is tantalum pentoxide ($Ta_2O_5$). When the capacitor 10 is in use, the tantalum pellet 12 is positively charged and acts as the anode, and the manganese dioxide 16 is negatively charged and acts as the cathode. The capacitor also includes a tantalum anode lead wire 18, a layer of carbon 22, and a metallized outer electrode 20.

The prior art capacitor 10 is usually made by taking tantalum powder and compressing or compacting into a pellet. The resulting pressed pellet 12 then undergo a sintering process wherein the pellet 12 is heated in a vacuum.

The heating allows the tantalum particles to stick together so they can hold the lead wire 18.

After the sintering process, the pellet 12 is typically dipped in an acid solution to form a dielectric film 14 on the outer surface of the pellet 12. The pellet 12 is then subsequently coated with various other metal-containing materials which form the cathode. Typically, $MnO_2$ 16 is placed around the dielectric film 14 which may be followed by the layer of carbon graphite 22 which is painted with silver print 20. Other conductive polymers such as polypirrolle can also be used in place of manganese oxide. The cathode portion ends in a cathode termination.

The lead wire 18 is usually coated with an insulating substance such as Teflon™ (not shown). The lead wire 18 is typically the anode termination. These terminations can be connected to a circuit board for mounting the capacitor 10 in an electrical circuit.

Figure 1:
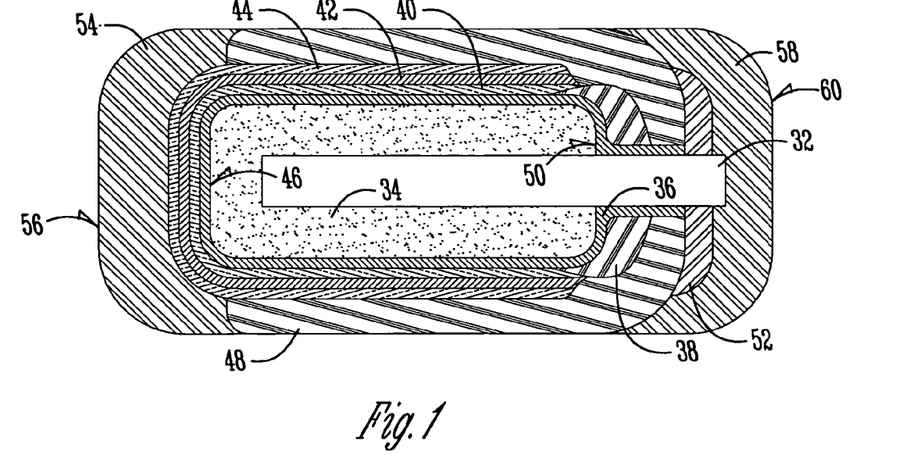
FIG. 1 is a side cross sectional view of a surface mount chip capacitor of the present invention.

FIG. 1 shows a surface mount chip capacitor 30 of the present invention. Note that in the figures, for clarity, the various portions of the capacitors are shown with straight and sharply cornered edges. The actual capacitors may have slightly rounded corners, etc. In addition, the capacitors have been shown in a standard shape and size; however, the shape and size may vary to include different lengths, widths, heights, size proportions of components, etc.

The capacitor includes a wire 32. The wire 32 is typically made of tantalum. Alternatively, the wire may be made of another valve metal (i.e., Niobium (Nb), Hafnium (Hf), Zirconium (Zr), Titanium (Ti), Vanadium (V), Tungsten (W), Beryllium (Be), or Aluminum (Al)). Alternatively, the wire may be made of a substrate containing a valve metal (i.e., Ta, Nb, Hf, Zr, Ti, V, W, Be, or Al). The wire is preferably between 50–100 µm thick. The wire may be a rectangular parallelepiped. Alternatively, the wire may be of various other shapes.

A conductive powder element 34 is upon the wire 32. The conductive powder element may be a valve metal. Alternatively, the conductive powder element may be a valve metal substrate. The conductive powder element 34 may have a low capacitor-voltage (CV) (i.e. 10 CV) up to 100–150 KCV. The conductive powder element 34 before being placed upon the wire 32 may be in a form of a powder that is regularly agglomerated, sieved, and/or crushed. The conductive powder element 34 has a density in the range of 3–8 g/cc when attached to the wire 32 in a layer.

A dielectric film 36 is over the surface of the conductive powder element 34 and the anode wire 32. The dielectric film 36 is typically tantalum pentoxide ($Ta_2O_5$). An insulative coating 38 such as Teflon™ coats a portion of the anode wire 32 and the sintered tantalum layer 34.

A solid electrolyte, i.e. manganese dioxide ($MnO_2$) or a conductive polymer, is a dielectric exterior 40. The solid electrolyte impregnates spaces within the dielectric film 36 coated conductive powder element 34 to form the cathode of the capacitor.

A conductive counterelectrode layer overlies the dielectric exterior 40 and is in electrical continuity with the manganese dioxide cathode of the capacitor 30. The counterelectrode layer is preferably comprised of a first sublayer 42 of graphite carbon and an overlayer of metal particles 44, preferably silver, in a binder or organic resin. The counterelectrode layer must extend over the cathode end 46 of the tantalum layer 34 as well as helps seal the manganese dioxide layer 40. The counterelectrode layer overlies substantially all of the side surfaces and the cathode end 46 of the tantalum layer 34 to obtain a capacitor having a minimum dissipation factor and ESR, but is maintained separate from, and out of electrical continuity with the anode wire 32.

An organic coating or pasivation coating 48 is formed over the counterelectrode layer on the side surface of the tantalum layer 34 and over the insulative coating 38 at the anode end 50 of the tantalum layer 34 while not extending over the cathode end 15. A silver print anode 52 is bonded at the anode end 50 of the tantalum layer 34 over the organic coating 48 and in contact with the anode wire 32. A cathode end cap 54 is bonded in contact with the cathode end 46 of the counterelectrode layer, thus forming a cathode terminal or second terminal 56. An anode end cap 58 is bonded in contact with the anode end 50 coating the silver print anode 52 and a portion of the insulative coating 48, thus forming an anode terminal or first terminal 60.

The cathode terminal 56 and the anode terminal 60 are connections that can be connected to a circuit board for mounting the capacitor 30 in an electrical circuit. While the method described below and shown in FIGS. 2–14 below is applied to a capacitor, it is also possible to utilize the present method for any type of chip component requiring termination at opposite end.

Figure 2:
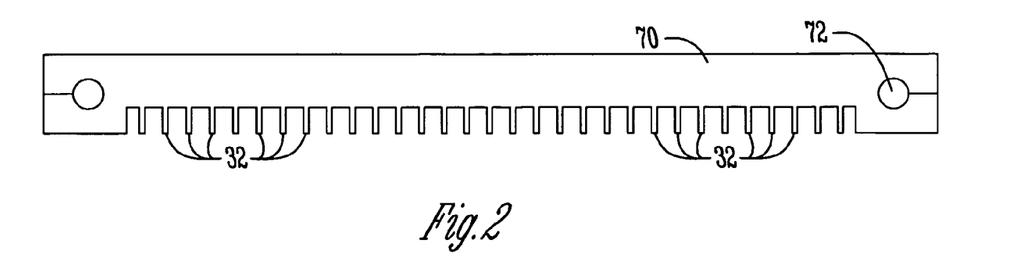
FIGS. 2–5 are top views of the surface mount chip capacitor shown in FIG. 1 at various manufacturing stages.

FIG. 2 is a top view of a foil strip 70 in a comb shape. The comb shape is produced by mechanically punching. Alternatively, the comb shape may be made by other chemical or physical methods. The foil strip 70 is preferably 50–100 µm thick, 0.8 mm long, and 0.08 mm wide. The comb is made up of individual tantalum wire 32.

Figure 3:
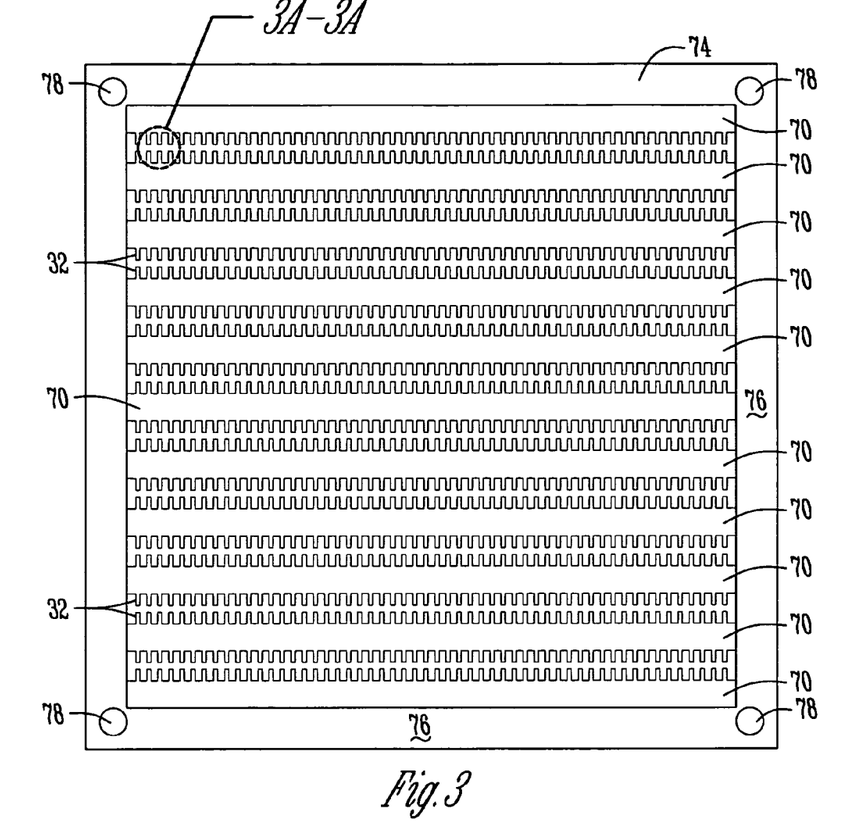
Figure 3A:
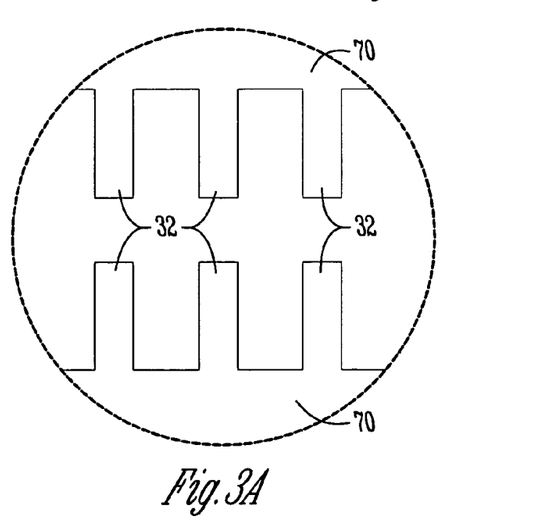

The foil strip 70 also has holes 72 on the outside edges. The holes 72 are used to place the foil strip 70 into a frame 74. As seen in FIG. 3, the frame 74 has a top section 76 and a bottom section (not shown). Upon the bottom section are male receptacles (not shown) that receive holes 72. The foil strips 70 are arranged such that the wires 32 are facing one another. The frame 74 in FIG. 3 holds 20 foil strips 70. Once all the foil strips are in place connectors 78 lock the foil strips 70 in place. Once locked in place, the foil strips are masked.

The foil strips 70 and frame 74 are but one apparatus for handling the punched wires 32. Alternatively, a single foil strip may be used having a single row of wires 32. Still alternatively, a single wide foil strip may be used to replace the series of foil strips 70 as seen in FIG. 3 and the wide foil strip punched to form wires 32.

Figure 4:
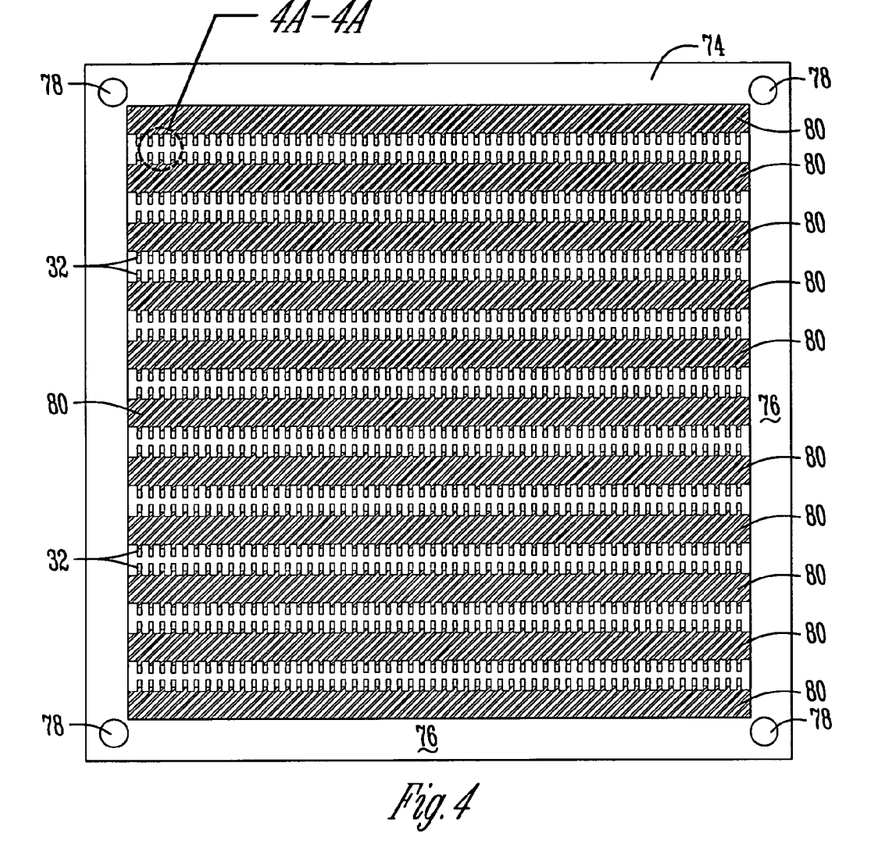
Figure 4A:
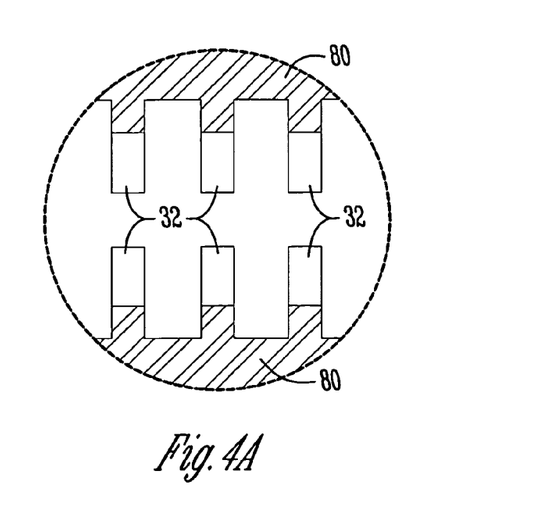

FIG. 4 is a top view of the foil strips 70 after being masked. The connection end of the wire 32 to the foil strips 70 are physically masked by placing a flat physical barrier 80 upon the foil strips 70 and a portion of the wire 32 contacting the foil strip 70. The conductive powder element 34 can then be formed on the wire 32.

The conductive powder element 34 is placed upon the wire by electrophoretic deposition that comprises essentially two steps: first, charged particles of powder (0.2–40 µm) in suspension are moved to the wire 32 by applied voltage and second, the particles of powder are deposited (discharged and flocculated) on the wire 32. The resulting film of charged particles is the conductive powder element 34 which is dense and uniform.

Figure 5:
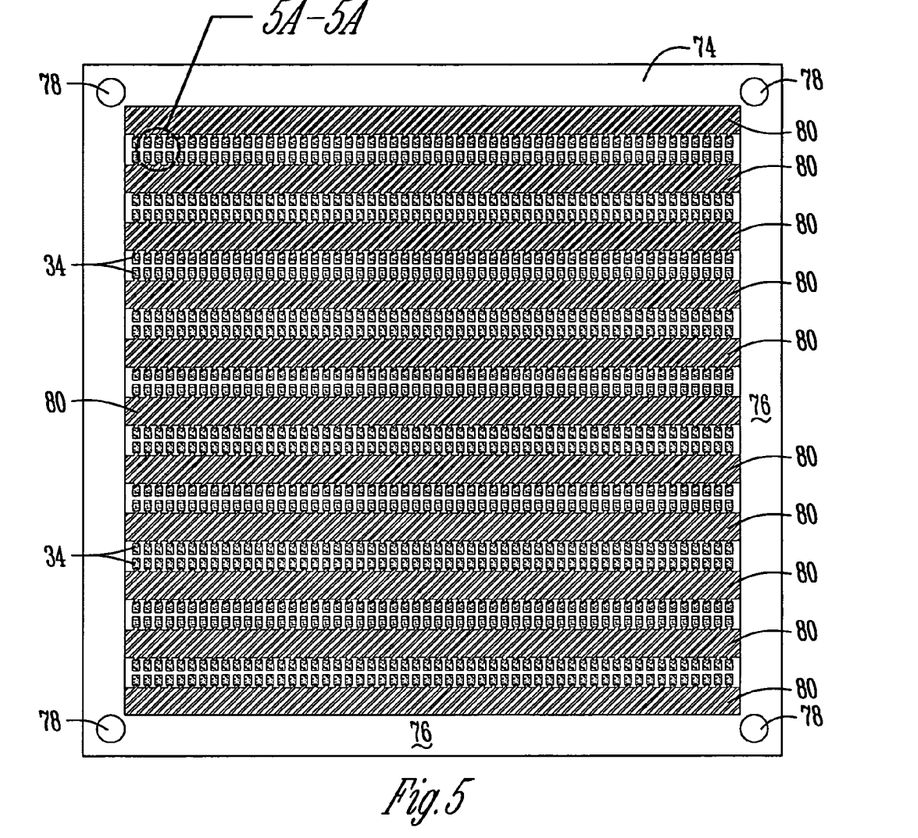
Figure 5A:
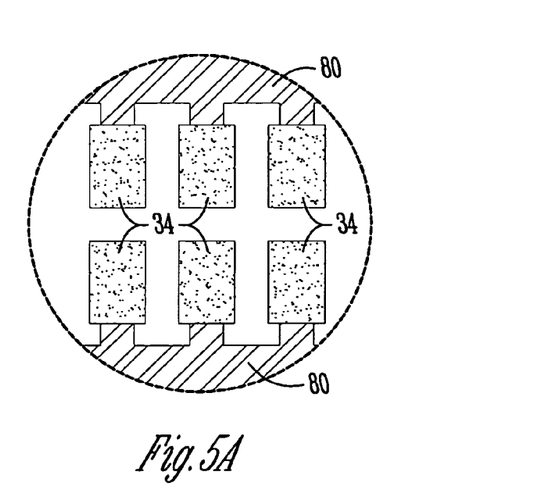

FIG. 5 is a top view of the foil strips 70 with the mask 80 removed but with the conductive powder element 34 deposited.

Figure 6:
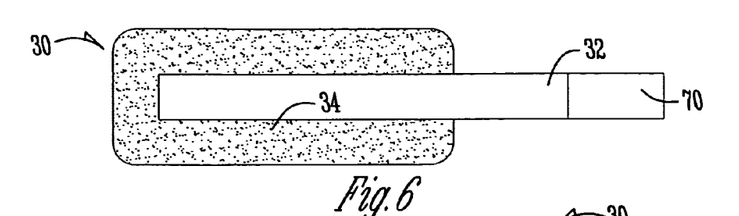
FIGS. 6–14 are side cross sectional views of the surface mount chip capacitor shown in FIG. 1 at various manufacturing stages.

As seen in FIG. 6, the next step is to place the entire frame 74 with strips 70 through a sintering process to heat the conductive powder element 34 in a vacuum. The temperature for this process is between 600–1400 C. for tantalum and niobium. The conductive powder element 34 is held in a vacuum at the specified temperature for between about 2–20 minutes and then cooled in accordance with conventional cooling procedures that are well known in the art.

Figure 7:
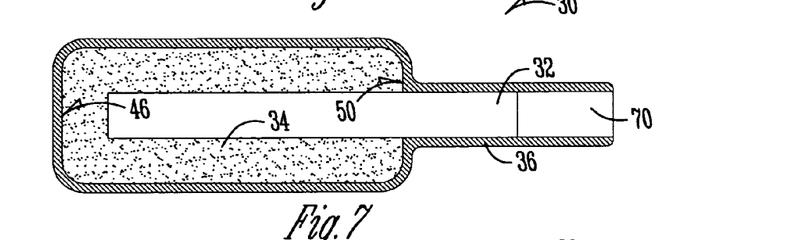

As seen in FIG. 7, after the sintering process the conductive powder element 34 is placed in an oxygen-forming solution such that a thin dielectric film 36 is formed. As an example, when using tantalum or niobium powder the thin dielectric film 36 will be tantalum pentoxide or niobium pentoxide.

Figure 8:
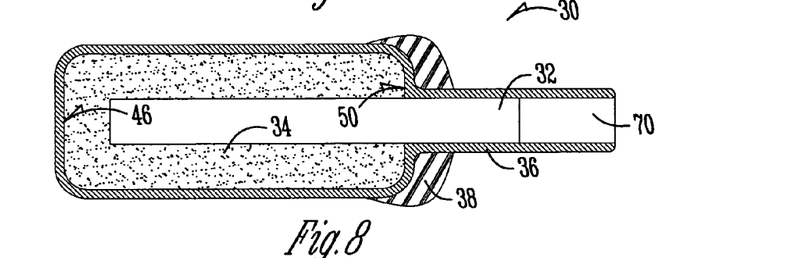

The next step in the process, as seen in FIG. 8, is the addition of a Teflon™ print or other insulating substance 38.

Figure 9:
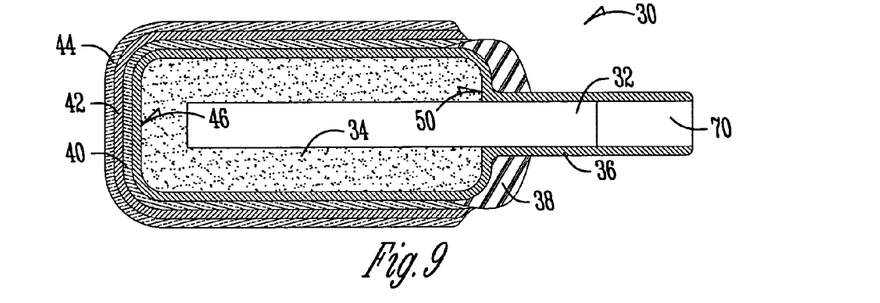

Next, as seen in FIG. 9, the cathode portion of the capacitor is formed. Typically, manganese oxide 40 is placed around the dielectric film 36 which may be followed by a layer of carbon graphite 42 which is printed with silver 44. The silver print 44 is comprised of an organic resin heavily filled with silver flakes, making it conductive.

Figure 10:
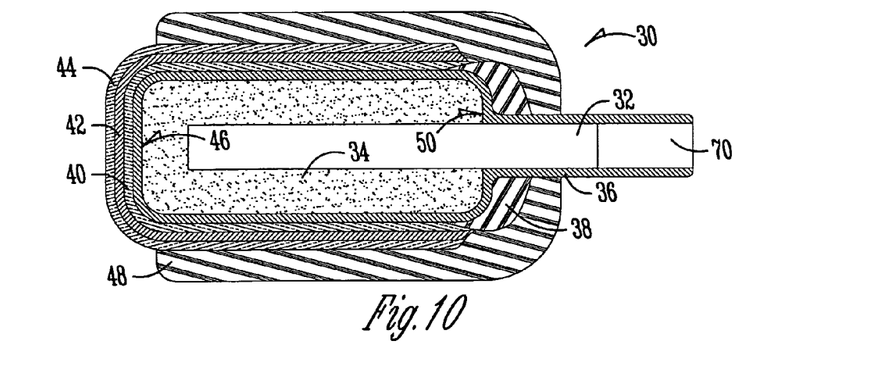

As seen in FIG. 10, an insulation or passivation material 46 is placed surrounding at least a portion of the conductive powder element 34 and a portion of the wire 32 side surfaces.

Figure 11:
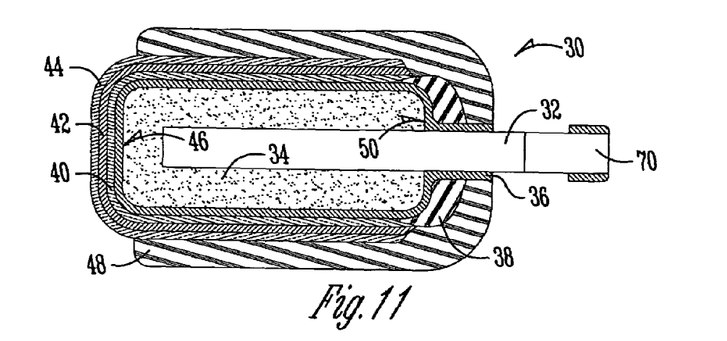
Figure 12:
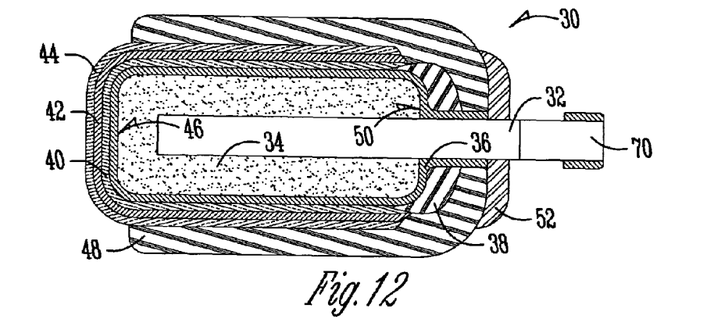

As seen in FIG. 11, the anode is laser opened to expose the wire 32. While laser opening is the preferred method to expose the conductive surface of the wire 32, other techniques could be used. With any process, the conductive surface of the wire 32 should be exposed. Once the wire is exposed, a silver print 52 can be applied which is the same as silver print 44.

Figure 13:
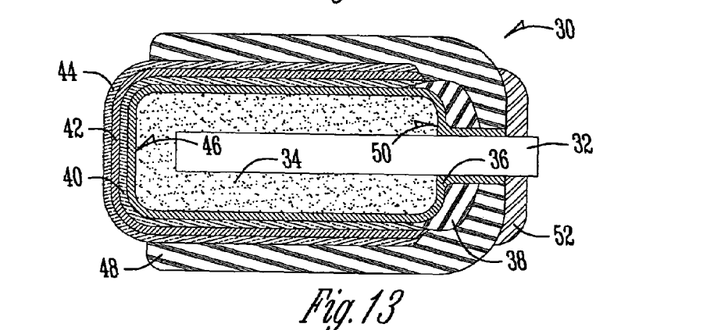

The next step is to cut the surface mount chip capacitor 30 from the strips 70, as seen in FIG. 13. The surface mount chip capacitor 30 may be removed from the strips a number of ways well known in the art.

Figure 14:
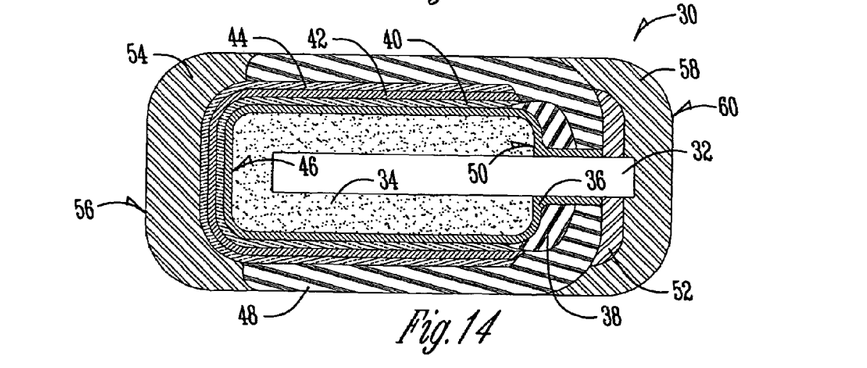

The final step, as seen in FIG. 14, is to solder a cathode end cap 52 and an anode end cap 58. The cathode end cap 52 is in contact with the cathode end 46 of the counterelectrode layer, thus forming a cathode terminal 56. An anode end cap 58 is bonded in contact with the anode end 50 coating the silver print anode 52 and a portion of the insulative coating 48, thus forming an anode terminal 60.

While the present invention can be accomplished using the methods described above, it us understood that various other methods could be used within the spirit and scope of the present invention.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A method of creating a surface mount chip capacitor comprising:
    forming a wire having opposite first and second ends;
    forming a conductive powder element upon the wire covering the second end, the conductive powder element having a cathode end and an anode end;
    applying an insulation material in covering relation over the anode end, whereby the wire extends through and has a portion protruding from the insulation material;
    applying an anode layer of conductive material onto the wire and over the insulation material adjacent the anode end of the conductive powder element so that the conductive material is in electrical contact with the wire first end and the wire first end protrudes beyond the material;
    attaching a conductive anode termination cap in covering relation over, and in contact with, the anode layer of conductive material and the first end of the wire, whereby electrical continuity is achieved from the anode end of the powder element, through the wire and the anode layer of conductive material to the anode termination cap;
    applying a layer of conductive material over at least a portion of the cathode end of the conductive powder element; and
    attaching a conductive cathode termination cap in covering relation over, and in electrical contact with, the cathode end of the conductive powder element.

2. The method of claim 1 wherein the wire is formed by pressing foil.

3. The method of claim 2 further comprising arranging the foil for acceptance into a reel to reel process.

4. The method of claim 3 further comprising masking the foil for application of the powder element onto the wire.

5. The method of claim 4 further comprising electrophoretically depositing the powder element upon the wire.

6. The method of claim 5 wherein the powder element is from the group consisting of: Ta, Nb, Hf, Zr, Ti, V, W, Be, and Al.

7. The method of claim 5 wherein the powder element is a substrate of a metal from the group consisting of: Ta, Nb, Hf, Zr, Ti, V, W, Be, and Al.

8. The method of claim 5 wherein the conductive powder element has a density between 3–8 g/cc.

9. The method of claim 5 wherein the conductive powder element has a capacitance-voltage between 10 CV and 150 KCV.

10. A method of forming a surface mount chip capacitor, comprising:
    providing a wire having first and second ends;
    forming a conductive element around the wire while leaving an end of the wire exposed;
    applying an insulative layer over a portion of the conductive element while leaving the wire end extending beyond the insulative layer;
    applying first and second terminals at opposite ends of the capacitor, with the terminals being separated by the insulative layer and one of the terminals covering and contacting the wire end; and
    the terminals and insulative layer sharing a common outer perimeter.

11. The method of claim 10 further comprising surrounding the first end of the wire with the conductive element.

12. The method of claim 10 further comprising encapsulating the conductive element with a dielectric film.

13. The method of claim 12 further comprising providing a counter electrode layer around a first portion of the film.

14. The method of claim 13 further comprising providing an insulative coating over a second portion of the film.

15. The method of claim 14 wherein the insulative layer covers the insulative coating and partially surrounds the counter electrode layer.

16. The method of claim 10 further comprising providing an anode between the insulative layer and the second terminal.

17. The method of claim 10 wherein the wire is arranged for acceptance in a reel to reel process.

18. The method of claim 10 further comprising masking the wire for applications of the conductive element.

19. The method of claim 10 further comprising electrophoretically depositing the conductive element upon the wire.

20. The method of claim 10 wherein the conductive element is from the group consisting of: Ta, Nb, Hf, Zr, Ti, V, W, Be, and Al.

21. The method of claim 10 wherein the conductive element is a substrate of a metal from the group consisting of: Ta, Nb, Hf, Zr, Ti, V, W, Be, and Al.

22. The method of claim 10 wherein the conductive element has a density between 3–8 g/cc.

23. The method of claim 10 wherein the conductive element has a capacitance-voltage between 10 CV and 150 KCV.

* * * * *